United States Patent [19]

Albright et al.

[11] 4,218,287
[45] Aug. 19, 1980

[54] METHOD OF AVOIDING AGGLOMERATION IN FLUIDIZED BED PROCESSES

[75] Inventors: Charles W. Albright, S. Charleston; H. G. Davis, Charleston, both of W. Va.

[73] Assignee: Union Carbide Corporation, New York, N.Y.

[21] Appl. No.: 712,920

[22] Filed: Aug. 9, 1976

Related U.S. Application Data

[63] Continuation of Ser. No. 536,843, Dec. 27, 1974, abandoned.

[51] Int. Cl.² .................. C10B 49/22; C10B 55/10; C10B 57/08
[52] U.S. Cl. ............................. 201/9; 201/31; 208/8 R; 208/127; 208/137; 208/157
[58] Field of Search ............... 201/9, 31; 208/8, 137, 208/157, 127

[56] References Cited

U.S. PATENT DOCUMENTS

| | | | |
|---|---|---|---|
| 2,167,099 | 7/1939 | Benezech | 201/9 |
| 2,577,632 | 12/1951 | Roetheli | 201/31 |
| 2,709,675 | 5/1955 | Phinney | 201/31 |
| 2,987,465 | 6/1961 | Johanson | 208/10 |
| 3,070,515 | 12/1962 | Sylvander | 201/9 |
| 3,551,513 | 12/1970 | Suzukawa et al. | 208/127 |
| 3,617,524 | 11/1971 | Conn | 208/157 |
| 3,927,996 | 12/1975 | Knudsen et al. | 148/197 R |

Primary Examiner—Barry S. Richman
Attorney, Agent, or Firm—Alvin H. Fritschler

[57] ABSTRACT

A fluidized stream of coal particles is introduced into the bottom of a vertical reaction zone in a fluidized bed process at a velocity of greater than about 200 ft/sec in a vertically upwards direction, wherein agglomeration of the fluidized bed is prevented. A separate liquid hydrocarbon stream is simultaneously introduced as a separate injection stream in a vertically upwards direction, said coal particles and said liquid hydrocarbons being rapidly and uniformly dispersed within the fluidized bed and reacted therein with a suitable reagent.

1 Claim, 1 Drawing Figure

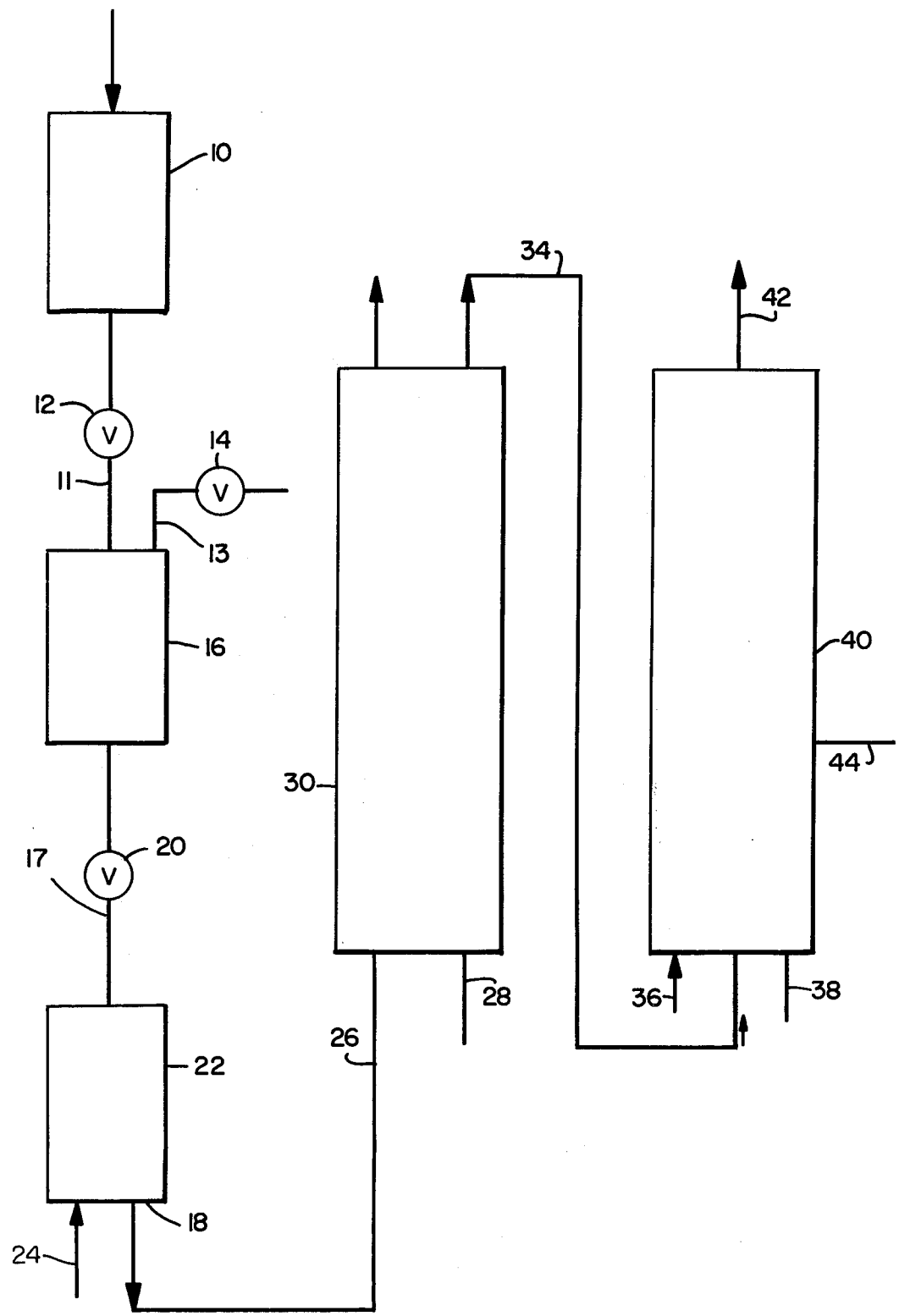

METHOD OF AVOIDING AGGLOMERATION IN FLUIDIZED BED PROCESSES

This application is a continuation of our prior U.S. application Ser. No. 536,843 filed Dec. 27, 1974 and now abandoned.

BACKGROUND OF THE INVENTION

1. Field of the Invention

This invention relates to a method of preventing agglomeration of carbonaceous solid particles in a fluid bed in coal conversion processes. More particularly, this invention relates to improvements in a process for reacting coal particles separately introduced liquid hydrocarbons in a fluid-bed hydrocarbonization zone.

2. Description of the Prior Art

Increasing energy needs have focused attention on solid fossil fuels due to their availability in the United States in a relatively abundant supply and their potential value if converted into more useful forms of energy and feedstock. Processes such as carbonization, gasification, hydrocarbonization and hydrogasification, wherein synthetic fuel products have been prepared by introducing a fluidized stream of finely-divided coal particles into a fluid-bed reaction zone and reacting the coal particles at elevated temperatures in the presence of inert gases, air, steam, hydrogen or the like, are well known. A major operating difficulty in such processes has been the tendency of coal particles, especially intensified in a hydrogen-rich atmosphere, to agglomerate at the elevated temperatures required for reaction.

Coal particles, especially caking, swelling or agglomerating coals, become sticky when heated in a hydrogen-rich atmosphere. Even non-caking, non-swelling and non-agglomerating coals become sticky when heated in such an atmosphere. Coal particles begin to become sticky at temperatures in the range of about 350° C. to about 500° C., depending on the specific properties of the coal, the atmosphere and the rate of heating. The stickiness results due to a tarry or plastic-like material forming at or near the surface of each coal particle, by a partial melting or decomposition process. On further heating over a time period, the tarry or plastic-like material is further transformed into a substantially porous, solid material referred to as a "char." The length of this time period, generally in the order of minutes, depends upon the actual temperature of heating and is shorter with an increase in temperature. By "plastic transformation" as used throughout the specification is meant the hereinabove described process wherein surfaces of coal particles being heated, particularly when heated in a hydrogen atmosphere, develop stickiness and transform into substantially solid char, non-sticky surfaces. "Plastic transformation" is undergone by both normally agglomerating coals and coals which may develop a sticky surface only in a hydrogen-rich atmosphere.

Agglomerating or caking coals partially soften and become sticky when heated to temperatures between about 350° C. to about 500° C. over a period of minutes. Components of the coal particles soften and gas evolves because of decomposition. Stick coal particles undergoing plastic transformation tend to adhere to most surfaces which they contact such as walls or baffles in the reactor, particularly relatively cool walls or baffles. Moreover, contact with other sticky particles while undergoing plastic transformation results in gross particle growth through adherence of sticky particles to one another. The formation and growth of these agglomerates interferes drastically with the maintenance of a fluid-bed and any substantial growth usually makes it impossible to maintain fluidization.

In particular, entrance ports and gas distribution plates of equipment used in fluid-bed coal conversion processes become plugged or partially plugged. Furthermore, even if plugging is not extensive, the sticky particles tend to adhere to the walls of the vessel in which the operation is conducted. Continued gross particle growth and the formation of multi-particle conglomerates and bridges interferes with smooth operation and frequently results in complete stoppage of operation.

Agglomeration of coal particles upon heating depends on operating conditions such as the heating rate, final temperature attained, ambient gas composition, coal type, particle size and total pressure. When heated in a hydrogen atmosphere, even non-agglomerating coals, such as lignites or coals from certain sub-bituminous seams, are susceptible to agglomeration and tend to become sticky in a hydrogen atmosphere. Thus, agglomeration of coal particles is accentuated in a hydrocarbonization reactor where heating in the presence of a hydrogen-rich gas actually promotes formation of a sticky surface on the coal particles reacted. Moreover, in general, introducing any carbonaceous, combustible, solid particles, even those that are normally non-agglomerating, to a fluid-bed having an atmosphere tending to induce agglomeration can result in agglomeration and defluidization of the bed.

Heavy liquid materials are also fed at times to the fluid-bed in coal conversion processes. They may be recycled heavy tar products to be converted to lower molecular weight products, light liquids and gases. Or they may be heavy liquids from an external source added, for example, to enrich the normal gas and/or liquid product, or as a means of waste disposal. Feeding such liquids is known to cause rapid loss of fluidization due to particle agglomeration and plugging.

In an attempt to overcome the problems associated with agglomeration, char as a recycle material from fluidized bed processes has been mixed with an agglomerating type coal feed at a ratio as high as 8 to 1. Also, tar has been ball-milled with a great excess of adsorbent char before feeding into the processes. However, since such procedures reduced the unit throughput, they are wasteful of energy and therefore costly. Other attempts included a pretreatment step wherein coal was oxidized and/or devolatilized superficially in order to prevent sticking and agglomeration of particles, but this lowered yields of useful products and added costs. Thus, it is highly desirable economically to avoid or at least reduce the extent of such pretreatment or such char recycle.

SUMMARY OF THE INVENTION

It is an object of this invention to provide a method of substantially preventing agglomeration of carbonaceous combustible, solid particles and separately introduced hydrocarbon liquid in a fluid-bed in coal conversion processes. Another object is to provide improvements in a hydrocarbonization process for the preparation of fuel products. Still another object is to provide a process whereby all types of particulate coal can be handled in a continuous process without agglomeration and plugging type problems.

Briefly, this invention relates to the discovery that agglomeration of coal particles in a fluidized bed may be substantially prevented by introducing the coal particles into a fluid-bed reaction zone at a high velocity. The fluid-bed is conventionally maintained by passing a fluidizing medium through finely-divided solid particles. "Introduction velocity" as used throughout the specification means the velocity of carrying gas through a device which causes the solids or liquid velocity to approach the maximum theoretical ratio to gas velocity, i.e., 1 to 1. By a high velocity is meant a velocity sufficient to rapidly and uniformly disperse fresh coal particles entering the fluid-bed at a temperature below the plastic transformation temperature within a matrix of non-agglomerating particles in the fluid-bed. The non-agglomerating particles contained in the fluid-bed may include inert materials such as ash, sand recycled char and the like which are inherently non-agglomerating. However, preferably, the non-agglomerating particles are hot, partially reacted coal particles and char particles that have undergone plastic transformation and are situated within the fluid-bed reaction zone at the reaction temperature. Ordinarily, due to the difference of temperature between the entering coal particles and the reaction zone, heat is transferred rapidly from the reaction zone to the entering coal particles which then tend to undergo plastic transformation and agglomerate. However, it has been found that when introduced in the fluid bed at a high velocity, the entering coal particles rapidly and uniformly disperse within a matrix of non-agglomerating particles within the fluid-bed before undergoing plastic transformation.

Introduction of coal particles into the fluid-bed at a high velocity as described hereinabove, promotes rapid, turbulent mixing of the entering particles with the particles circulating in the fluid-bed. This prevents their coherence and defluidization of the bed. Instead, the entering, sticky or potentially sticky coal particles are rapidly distributed at a temperature below their plastic transformation temperature and brought into intimate association with non-sticky, hot particles situated within the fluid-bed reaction zone. The entering particles do not adhere to these non-agglomerating hot particles which have passed through the plastic transformation-temperature range or are inherently non-agglomerating materials as described above. The hot non-agglomerating particles or materials at bed temperature transfer heat to the entering coal particles. This heat transfer enables the entering coal particles to traverse the plastic transformation-temperature range without contacting significant numbers of other sticky coal particles beforehand. Consequently, the fresh coal particles undergo plastic transformation without a significant amount of agglomeration occuring in the fluid-bed reaction zone.

This invention is particularly applicable as an improvement in a hydrocarbonization process utilizing a dense phase fluid-bed. By the term "hydrocarbonization" as employed throughout the specification is meant a pyrolysis or carbonization in a hydrogen-rich atmosphere under such conditions that significant reaction of hydrogen with coal and/or partially reacted coal and-/or volatile reaction products of coal occurs. By dense phase as used throughout the specification is meant a concentration of solids in fluidizing gas of from about 5 pounds to about 45 pounds of solids per cubic foot of gas, more typically from about 15 pounds to about 40 pounds of solids per cubic foot of gas. In a hydrocarbonization process employing a dense phase fluid-bed, the particles in the bed are substantially backmixed, which ensures a near uniform-composition of particles throughout the bed. Since the fluid-bed is in dense phase, fresh coal particles should enter the bed at a velocity sufficient to penetrate and spread rapidly throughout the bed.

A velocity rate useful in the method of this invention may be obtained by any suitable means. For example, an inlet means having a passageway whose cross-sectional area is tapered, narrowed or necked down may be employed to accelerate the coal particles to a high velocity. In addition, process gas may be physically added to the fluidized stream of fresh coal particles at a point before the fluidized stream enters the inlet to the reactor. The addition of process gas increases the flow rate of the fluidized stream and hence the velocity of the coal particles. An amount of process gas sufficient to achieve the desired entrace velocity of coal particles should be used.

Since the fluidized coal particles are transported through the lines in a dense phase flow, a flow rate velocity equivalent to the injection velocity in the reactor is usually unnecessary and undesirable due to the abrasive characteristics of coal. A high velocity flow of coal particles throughout the lines would have required wear plates to be installed throughout the lines to control the otherwise rapid erosion rate of the lines, such wear plates being an undesirable expense. However, according to the present invention, only a small surface area in the immediate vicinity of the reactor, will be exposed to abrasive wear and this part may be replaced readily and economically with little or no downtime of the system.

For example, an inlet means comprising a material having a wear-resistant surface may preferably be employed in this invention as a means for increasing the velocity of coal particles entering the reaction zone and as a means of controlling the manner of entry. Use of such an inlet means lengthens the wear time of the surface exposed to the high erosion rate caused by the high velocity flow of coal particles. Suitable wear-resistant surface may be composed of materials such as tungsten carbide, silicon carbide or other wear-resistant materials known in the art in any combination or mixture thereof. For clarity and illustrative purposes only, the description of this invention will be mainly directed to the use of tungsten carbide as the wear-resistant surface of the material that reduced erosion in the lines although any number of other wear-resistant materials can be used successfully according to this invention.

An inlet means such as a nozzle which comprises a transfer line having a reduced or constricted cross-sectional area may be employed in the method of this invention. The length to cross-sectional area ratio of the nozzle should be sufficiently large enough so that the desired velocity of injection for the solid coal particles or non-vaporizable recycle oil may be achieved. A length to cross-sectional area of this section of transfer line of greater than about 5 to 1 is desirable, greater than about 10 to 1 preferable. This allows for a finite distance which the coal particles and/or vaporizable recycle oil require for acceleration to the velocity approaching that of the carrying gas.

According to this invention, it is preferable to introduce a fluidized stream of coal particles into the lower portion of a substantially vertical fluid-bed reaction zone. More preferably, the particles are introduced into the reaction zone through at least one inlet means in a reactor in a vertically upward direction. The inlet means is situated substantially in the vicinity of the vertical axis at or near the reactor bottom. The coal particles are introduced at a velocity sufficient to mix the fresh coal having a temperature below the plastic transformation-temperature rapidly with non-agglomerating particles such as partially reacted coal and char particles in the reaction zone at the reaction temperature thereby substantially preventing agglomeration of the fluid-bed.

In the reactor, which is preferably substantially vertical, the natural circulation of coal particles within the fluid-bed reaction zone is a complex flow pattern. However, it may be described approximately by dividing the reaction zone into two concentric sub-zones, an inner sub-zone and an outer sub-zone surrounding the inner sub-zone. In the inner sub-zone which is situated substantially within the axially central portion of the reactor, coal particles flow in a generally ascending path. In the outer sub-zone which is situated substantially near the walls of the reactor, coal particles flow in a generally descending path. Advantages of introducing the coal particles into the fluid-bed through the bottom of the reactor in an essentially vertically upwards direction are that the natural circulation of coal particles in the fluid-bed is enhanced and that the coal particles get at least a minimum residence time. Introduction of coal particles into the fluid-bed through the bottom of the reactor promotes a channeled circulation of particles within the reaction zone along the natural circulation path. Circulation eddies, are thus enhanced and promote the dispersion of the entering coal particles with a matrix of non-agglomerating particles within the fluid-bed reaction zone.

The fluidized coal particles should be introduced into this inner sub-zone, the central upflow zone within the reactor. The central upflow zone extends radially from the vertical axis of the reactor to an area where the outer sub-zone, the peripheral downflow zone begins. it is essential that the coal particles be introduced into the central upflow zone in order to avoid striking the walls of the reactor or entering the peripheral downflow zone. Preferably, the coal particles are introduced through the base or bottom of the reactor at one or more inlets situated in the vicinity of the point where the vertical axis of the reactor intersects the base of the reactor.

It has been discovered that introducing a fluidized stream of coal particles into a dense phase, fluid-bed reaction zone at a velocity of more than about 200 feet per second in a manner described hereinabove substantially prevents agglomeration or caking of the fluid-bed. When a lower injection velocity, for example, about 100 feet per second is used, agglomeration of the fluid-bed is not prevented. In order to substantially prevent agglomeration of the fluid-bed reaction zone, coal should be introduced at a high velocity into the zone in a high velocity stream, i.e. at a velocity more than about 200 feet per second, and preferably more than about 400 feet per second in the manner described hereinabove. "Reaction zone" as used throughout the specification is meant to include that area wherein carbonaceous, combustible, solid and sometimes liquid particles, are reacted to form char, liquid and/or vapor fuel products in coal conversion processes such as carbonization, gasification and dry hydrogenation (hydrocarbonization). A zone of reaction can also be referred to by the name of the process e.g., hydrocarbonization zone is the reactio zone in a hydrocarbonization process.

This invention is applicable to the various coal conversion processes mentioned hereinabove. For example, a hydrocarbonization process can be improved to handle both agglomerating and/or non-agglomerating coals in a continuous manner and maintain fluidization of the fluid-bed. In a hydrocarbonization process, a dense phase flow of coal particles may be passed through a preheating zone before entering a fluid-bed hydrocarbonization zone wherein the coal particles are rapidly heated in the presence of a hydrogen-rich, essentially oxygen-free gas, to an elevated temperature above about 500° C. where the desired reactions can occur. The improvement according to this invention comprises introducing the preheated fluidized coal particles into the fluid-bed through the bottom of a hydrocarbonization zone in an essentially vertically upwards direction at a high velocity. This rapidly brings the entering coal particles to a nonsticky, high temperature, partially reacted state without their contacting too many coal particles also traversing the plastic transformation-temperature range. Preferably, the preheated, particulate coal in a fluidized state is introduced into a fluid-bed hydrocarbonization zone in a vertically upwards direction as described hereinabove at a velocity of more than about 200 feet per second and more preferably at a velocity of more than about 400 feet per second.

Coals have been classified according to rank as noted in the following table, Table A:

TABLE A.

Classification of Coals by Rank.[a]

(Legend: F.C. = fixed carbon; V.M. = volatile matter; B.t.u. = British thermal units)

| Class | Group | Limits of fixed carbon or B.t.u. ash free basis |
|---|---|---|
| I. Anthracite | 1. Meta-anthracite | Dry F.C., 98% or more (dry C.M., 2% or less) |
| | 2. Anthracite | Dry F.C., 92% or more and less than 98% (dry V.M., 8% or less and more than 2%) |
| | 3. Semianthracite[b] | Dry F.C., 86% or more and less than 92% (dry V.M., 14% or less and more than 8%) |
| II. Bituminous[d] | 1. Low-volatile bituminous coal | Dry F.C., 78% or more and less than 86% (dry V.M., 22% or less and more than 14%) |
| | 2. Medium-volatile bituminous coal | Dry. F.C., 69% or more and less than 78% (dry V.M., 31% or less and more than 22%) |
| | 3. High-volatile A bituminous coal | Dry F.C., less than 69% (dry V.M., more than 31%) |
| | 4. High-volatile B bituminous coal | Moist[c] B.t.u., 13,000 or more and less than 14,000[e] |
| | 5. High-volatile C bituminous coal[f] | Moist B.t.u., 11,000 or more and less than 13,000[e] |
| III. Sub-bituminous | 1. Sub-bituminous A coal | Moist B.t.u., 11,000 or more and less than 13,000[e] |
| | 2. Sub-bituminous B | Moist B.t.u., 9,500 or more and less than 11,000[e] |
| | 3. Sub-bituminous C coal | Moist B.t.u., 8,300 or more and less than 9,500[e] |
| IV. Lignitic | 1. Lignite | Moist B.t.u., less than 8,300 |
| | 2. Brown coal | Moist B.t.u., less than |

TABLE A.-continued

Classification of Coals by Rank.[a]

(Legend: F.C. = fixed carbon; V.M. = volatile matter;
B.t.u. = British thermal units)

| Class | Group | Limits of fixed carbon or B.t.u. ash free basis |
|---|---|---|
| | | 8,300 |

[a]This classification does not include a few coals that have unusual physical and chemical properties and that come within the limits of fixed carbon or B.t.u. of the high-volatile bituminous and subbituminous ranks. All of these coals either contain less than 48% moisture and ash free fixed carbon or have more than 15,500 moist, ash free B.t.u.
[b]If agglomerating, classify in low volatile group of the bituminous class.
[c]Moist B.t.u. refers to coal containing its natural bed moisture but not including visible water on the surface of the coal.
[d]It is recognized that there may be noncaking varieties in each group of the bituminous class.
[e]Coals having 69% or more fixed carbon on the dry, mineral-matter-free basis shall be classified according to fixed carbon, regardless of B.t.u.
[f]There are three varieties of coal in the high-volatile C bituminous coal group, namely, Variety 1, agglomerating and non-weathering; Variety 2, agglomerating and weathering; Variety 3, nonagglomerating and non-weathering.
Source: A.S.T.M. D388-38 (ref. 1).

As can be seen from Table A above, the preferred coals which may be used according to the present invention without any pretreatment step added to prevent agglomeration comprise the lowest ranked coals, the non-agglomerating, sub-bituminous and lignitic classes, III and IV.

Agglomerating coals, such as most bituminous and some sub-bituminous coals, are strongly agglomerating in a hydrogen atmosphere. They can not be handled conventionally even with a pretreatment step. These coals may now be handled without an injurious degree of defluidization by the process of this invention alone or in combination with a pretreatment step, if necessary. If a pretreatment step is necessary, the needs for pretreatment are milder and cost less. For example, at present even after heavy pretreatment, the use of a highly agglomerating coal such as Pittsburgh Seam Coal in a hydrocarbonization process presents the problem of agglomeration occurring in the fluid-bed. However, it is beneficial to use the process of this invention to overcome this agglomerating problem. Those skilled in the art will recognize that any number of suitable pretreatment steps may be applied in combination with the process of this invention for the handling of coals which are either highly agglomerating or highly agglomerating in a hydrogen-containing atmosphere. These pretreatment steps include, for example, but are not limited to, chemical pretreatment such as oxidation or mixing with inert solids such as recycle char.

The manner in which the invention is carried out will be more fully understood from the following description when read with reference to the accompanying drawing which represents a semi-diagrammatic view of an embodiment of a system in which the process of this invention may be carried out.

FIG. 1 illustrates coal supply vessels 10 and 16, a coal feeder 22, a preheater 30 and a reactor vessel 40. Lines are provided for conveying finely divided coal through the vessels in sequence. A line 26 conveys the coal from the pick up chamber 18 to the preheater 30. A line 34 conveys the coal from preheater 30 into the reactor vessel 40. A line 44 conveys devolatized coal (term "char") from the reaction vessel 40 for recovery as solid product or for recycle. A line 42 is provided for conveying liquid and vapor products from the reaction vessel 40 for further processing and/or recycle.

According to the process of this invention, the feed coal is in particulate form, having been crushed, ground, pulverized or the like to a size finer than about 8 Tyler mesh, and preferably finer than about 20 Tyler mesh. Furthermore, while the feed coal may contain adsorbed water, it is preferably free of surface moisture. Coal particles meeting these conditions are herein referred to as "fuidizable." Any such adsorbed water will be vaporized during preheat. Moreover, any such adsorbed water must be included as part of the inert carrying gas and must not be in such large quantities as to give more carrying gas than required.

The coal supply vessels 10 and 16 each can hold a bed of fluidizable coal particles, which are employed in the process. Coal supply vessel 10 is typically a lock-hopper at essentially atmospheric pressure. Coal supply vessel 16 is typically a lock-hopper in which fluidized coal can be pressurized with process gas or other desired fluidization gases.

Operation of vessels 10, 16, and 22 can be illustrated by describing a typical cycle. With valves 14 and 17 closed, lock-hopper 16 is filled to a predetermined depth with coal from lockhopper 10 through open valve 12 and line 11 at essentially atmospheric pressure. Then, with valves 12 and 17 closed, lock-hopper 16 is pressurized to a predetermined pressure above reaction system pressure through open valve 14 and line 13. Valves 12 and 14 are then closed and coal is introduced into fluidized feeder vessel 22 through open valve 17 and line 20. The cycle about lock-hopper 16 is then repeated. A typical time for such a cycle is from about 10 to about 30 minutes. With valve 17 closed, fluidized coal is fed at a predetermined rate through line 26 to the downstream-process units. Other variations of the feeding cycle to the fluidized feeder are possible, of course, but they are not illustrated herein since they do not form the inventive steps of this process.

In fluidized feeder 22, a fluidizing gas passes through line 24 at a low velocity sufficient to entrain the fluidizable coal and convey it in dense phase flow through line 26 and into the bottom of coal preheater 30, or directly to line 34 if no preheat is required. Alternately, additional gas could be added to the line conveying the coal in a dense phase flow through line 26 to assist in the conveyance. Any non-oxidizing gas can be used as the fluidizing gas, e.g. fuel gas, nitrogen, hydrogen, steam and the like. However, it is preferable, in general, to use reaction process gas or recycle product gas.

Coal preheater 30 is a means to rapidly preheat, when desirable, the finely divided coal particles, under fluidized conditions, to a temperature below the minimum temperature for softening or significant reaction range, in the substantial absence of oxygen. The maximum allowable temperature of heating is in the range of from about 325° C. to about 400° C. The stream of gas-fluidized coal in dense phase is heated upon passing rapidly through the heater having a very favorable ratio of heating surface to internal volume. The coal is heated in the heater 30 to the desired temperature by any convenient means of heat exchange, e.g., by means of radiant heat or a hot flue gas such as depicted in FIG. 1 as entering the bottom of heater 30 through line 28 and exiting at the top of the heater 30 through line 32.

Preheated fluidized coal particles exit the preheater 30 through line 34 and enter at or near the bottom of the reactor vessel 40 substantially near the center of the bottom. According to this invention, the coal particles are introduced into the fluid-bed reaction zone through the reactor bottom at a high velocity. This high velocity may be achieved by accelerating the fluidized stream of coal particles to the desired velocity along a constricted path of confined cross-section. A nozzle, narrow inlet port, tapered channel or any inlet means which narrows, constricts or necks down the cross-sectional area of the passageway to the inlet where the fluidized coal particles enter the reactor may be used to accelerate the fluidized stream of particles to the desired velocity. The stream of preheated, fluidizable coal particles is introduced into the central upflow zone of the fluid-bed within the reaction vessel at the high velocity in an essentially vertically upwards direction, preferably through the bottom of the reaction vessel.

Recycle oil may also be fed into reactor 40 through line 36. Injection of the recycle is also preferably at a stream velocity of about 200 feet per second or greater, and more preferably about 400 feet per second or greater into the central upflow zone of the fluid-bed of the reactor through the bottom of the reactor vessel in an essentially vertically upwards direction. Like the entering coal particles, the recycle oil stream follows a substantially ascending path about a substantially axially central portion of the reaction vessel. In the injection of the recycle oil and fluidizable coal particles, it is essential that they be introduced into the reactor vessel in such a way that they do not immediately and directly strike the walls of the reactor vessel, a result which could lead to unnecessary and undesirable agglomeration.

Only one inlet each for entry of the preheated coal particles and the recycle oil is shown in FIG. 1. These inlets may also represent a multiplicity of inlets for ease of operation of this process. A multiplicity of inlets may be desirable, for example, where the reactor is large, or when separate recycle streams of oil are being injected into the reactor. The entry points for the coal particles and/or recycle oil are preferably situated near the point where the vertical axis intersects the reactor bottom. Each stream of coal particles and/or recycle oil is preferably introduced at a high velocity at each inlet in an essentially vertically upwards direction, the inlets situated in or near the reactor bottom substantially near the point where the vertical axis intersects the reactor bottom. In this manner, the separate streams of entering carbonaceous materials are kept separate and apart until rapidly mixed in the fluid-bed with partially reacted coal and char particles.

The entering carbonaceous materials are reacted with a suitable reagent in the reaction zone at a temperature above about 500° C.

Char from reactor vessel 40 is continuously removed through line 44.

Liquid and vapor products are removed from the reactor vessel 40 through line 42. Fluidization gas is fed into the reactor vessel 40 through line 38, the type gas depending on the type process involved. For example, steam or steam and oxygen are fed into a gasifier in a gasification process; a non-reacting gas is fed into a carbonizer in a carbonization process; and a hydrogen-containing, substantially oxygen-free gas is fed into a hydrocarbonizer in a hydrocarbonization process.

The following examples are illustrative of the concept of this invention, demonstrating the method of preventing agglomeration of coal in fluidized bed processes via the high velocity injection of coal particles into a reaction zone.

EXAMPLE I

The apparatus employed, shown schematically in the drawings, comprised two coal feed lock-hoppers (10, 16) connected in parallel to a fluidized feeder 22, a preheater 30 and reactor 40. The entire coal conveying line was constructed of ⅝inch I. D. by ⅞inch O. D. tubing. The two coal feed lock-hoppers (10, 16) that fed the fluidized feeder alternately each had a 7-inch I. D. and height of 8 feet. The fluidized feeder 22 had a 24-inch I. D. and height of 20 feet. The preheater 30, a lead bath heated by "surface combustion" burners had a 24-inch I. D. and height of 12 feet. The reactor 40 had an 11-inch I. D. fluid-bed, a bed depth of 17½ feet an outside cross-sectional area of 0.66 sq. ft.

The average velocity through the dense phase coal feed line was not particularly high, the maximum velocity being approximately 40 feet per second at the inlet to the reactor and only 15 feet per second at the outlet of the coal feeder, erosion of the pipe at these velocities still remaining at an acceptable level. Attempts to feed the coal into the reactor at velocities of approximately 100 feet per second resulted in agglomeration and coking-up of the fluid-bed. A 15/32-inch diameter tungsten-carbide nozzle was used to increase the rate at which the fluidized coal-hydrogen stream was introduced into the reactor to 200 feet per second and provide an erosion resistance surface.

In operation, the reactor was filled with coal and slowly heated up toward the target conditions and gas flows and pressures were established. Hydrogen was employed as the gas phase. When the target conditions were established the coal feed was begun. On the termination of the run the reactor was opened up. No large agglomerates or coke particles were found. Operating conditions during the hydrocarbonization are shown in Table I below:

TABLE I

| | LAKE DE SMET COAL (Operating Conditions) | | | |
|---|---|---|---|---|
| Run Number | 1 | 2 | 3 | 4** |
| Reactor Pressure | 500–600 psig. | 600 psig. | 400–1000 psig. | 700 psig. |
| Reactor Temperature | *470° C.–520° C. | *470° C.–520° C. | 480° C. to 570° C. | 520° C.–560° C. |
| Fluidization Velocity | 0.5 ft/sec | 0.5 ft/sec | 0.25 ft/sec–0.5 ft/sec | 0.5 ft/sec |
| Coal Feed Rate | 1000–1200 lb/hr | 1000–1200 lb/hr | 600–1000 lb/hr | 1000 lb/hr |
| Feed Gas to the Reactor | Hydrogen | Hydrogen | Hydrogen | Hydrogen |
| Length of Run | 45 hours | 34 hours | 78 hours | 29 hours |
| Coal Stream Injection Velocity | 200 ft/sec | 200 ft/sec | 200 ft/sec | 200 ft/sec |
| Nominal Solids Residence time in bed | 18–22 minutes | 18–24 minutes | 19–46 minutes | 9.4 minutes |

*Initially 470° C. and increased in 10° C. increments every 6 hours with the added restriction that the reactor was cooled to 450° C.–470° C. after a coal feed stoppage and before starting the coal feed again.
**Bed depth of the reactor was shortened to 7 ft. 2 inches for this run. The analysis of the feed, is summarized in TABLE II below:

TABLE II

LAKE DE SMET COAL, WYOMING, SUBBITUMINOUS C (ANALYSIS)

| Moisture and Ash Free Basis | Weight Percent | |
|---|---|---|
| C | 72.0 | |
| H | 5.3 | |
| N | 1.3 | |
| S | 1.0 | |
| O | 20.4 | |
| Ash | 11.9 | (dry basis) |
| Water | 30 | (as received) |

EXAMPLE II

Two additional runs were conducted employing apparatus and procedures similar to those employed in Example I, except that oil, the higher boiling fractions (all product boiling above 235° C.) of the liquid product, was recycled to the reactor. These additional runs were conducted to determined whether a high velocity injection of heavy oil could be fed to the reactor without agglomerating the fluid-bed. The oil recycle equipment added to the pilot plant apparatus comprised a storage tank, to hold the recycle oil, an oil preheater to preheat the oil prior to injection into the reactor.

The main hydrogen stream to the reactor was split into two roughly equal streams, each of which was preheated to 300° C. to 350° C. The heavy recycle oil was pumped into one of these hydrogen streams and injected into the reactor through a ¼-inch diameter tungsten carbide nozzle at a stream velocity of approximately 400 feet per second. The nozzle, which pointed vertically up the reactor, was located in the center of the reactor bottom 5 feet above the coal inlet. The other hydrogen stream was mixed with preheated coal, and introduced into the bottom of the reactor through a 15/32-inch diameter tungsten-carbide nozzle at approximately 160 feet per second in a vertically upwards direction. The data for these runs are summarized below in Table III.

TABLE III

| Run | 1 | 2 |
|---|---|---|
| Coal Feed Rate | 1000 lb./hr. | 1000 lb./hr. |
| Coal Feeder Pressure | 1100 psig. | 1100 psig. |
| Reactor Pressure | 500 psig. | 500 psig. |
| Reactor Temperature | 550 C | 580 C |
| Reactor Fluidization Velocity | 0.5 ft./sec. | 0.5 ft./sec. |
| Length of Run | 5 hrs. | 5 hrs. |
| Recycle Oil Feed Rate | 100 lb./hr. | 240 lb./hr. |
| Coal - $H_2$ Inlet Velocity | 160 ft./sec. | 160 ft./sec. |
| Oil - $H_2$ Inlet Velocity | 420 ft./sec. | 420 ft./sec. |

No problems were encountered in making these runs. There was no evidence of agglomeration in the fluid-bed, even when injecting oil at the 240 lb./hr. rate.

EXAMPLE III

The bench-scale apparatus employed in this example comprised a pulverized solid hopper having a solid's capacity of 4.5 liters and constructed from a 3-inch diameter by 4-foot high schedule 80 carbon steel pipe; a reactor was made of 1-inch I.D. by 9-inch high stainless steel tube having a ¼-inch wall thickness and an expanded head 4-inches high and 2 inches I.D.; solids overflow line constructed of ½-inch Schedule 40 pipe; a vapor line constructed from ⅜-inch O. D. stainless steel tubing; and a solids feeder. Two liquid feed pumps, Lapp Microflow Pulsafeeders were used, one to feed the liquid being investigated and the other to feed water for steam generation. Electrically heated liquid and water vaporizers and superheaters constructed of ¼-inch O. D. stainless steel tubing were installed between the feed pumps and the feed injection nozzle to the reactor. Thermocouples located 3,6,8 and 11-inches from the bottom of the reactor were installed in a ¼-inch O.S. thermowell placed axially in the center of the reactor. The lower three thermowell were in the fluidized bed while the upper thermocouple was in the vapor space above the bed.

In operation, tars boiling about 235° C. obtained from hydrocarbonization of Lake de Smet Coal were employed as the feedstock to the reaction zone for conversion to oils boiling below 230° C. The tars were distilled from the whole liquid product obtained from the hydrocarbonization into various distillation fractions and a blend of these distillation fractions used in this example had a nominal atmospheric temperature range for 75% of the tar between 235° C. and 460° C. The remaining 25% boiled above 460° C.

The soilds feed hopper was filled with Lake de Smet hydrocarbonization char as described hereinabove. The water and tar feed reservoirs were filled and heated to operating temperature. During the heat up period, a predetermined flow of hydrogen passed through the empty reactor. As soon as operating conditions were approached, the char feed and water feed (superheated steam by the time it entered the reactor through the injection orifice) were started. The three thermocouples located in the fluidized bed, at the levels indicated hereinabove, served as an indication of bed behavior. Attempts to feed this tar stream at velocities of 100, 200 and 300 feet per second resulted in rapid agglomeration of the fluidized reactor bed. A 26-gauge hypodermic needle used was to achieve a 400 feet per second injection velocity of the whole tar feed. Using this inlet velocity for the whole feed, coking up of the fluidized bed within the reactor was prevented under the following operating conditions contained in Table IV.

TABLE IV

OPERATING CONDITIONS - LAKE DE SMET COAL

| | |
|---|---|
| Pressure | 150 psig |
| Hydrogen Partial Pressure | 115 psig. |
| Residence time of Vapors in Char Bed | |
| Based on Superficial Linear Velocity | 1.33 sec. |
| Char Feed | 250 g/hr. |
| Oil Feed Rate | 2 ml/min. |
| Water (as steam) Feed | 3 ml/min. |
| Hydrogen Flow to Reactor | 35 SCFH |
| Moles Hydrogen/Moles Oil | 45/1 |
| Temperature | 650° C. |
| Superficial Linear Velocity of Hydrogen | 0.5 ft./sec. |
| Time of Run | 5 hrs. |
| Fluidizing Gas | Hydrogen |

EXAMPLE IV 100 pounds per hour of Pittsburgh No. 8 seam coal, −20 mesh, are introduced into a low temperature, fluid-bed reactor for pyrolysis at a reactor temperature of 540° C. to obtain liquid products, gaseous fuel and dry char. Pittsburgh No. 8 seam coal is a highly swelling, agglomerating, high volatile A bituminous coal. Nominal residence time of the coal and the product char in the reactor bed is 15 minutes. When the coal is introduced into the reactor bed with recycled product gas at a coal and gas injection velocity of 20 feet per second, agglomeration of the reactor bed begins immediately. Within 30 minutes, the bed is highly agglomerated so that no fluidization occurs and no further coal can be injected as a practical matter.

However, when fresh coal is introduced into the fluid-bed of the reactor at injection velocities of 200, 300 and 400 feet per second, respectively, a fluid-bed at a reaction temperature between about 500° C. and about 700° C. is maintained without substantial agglomeration. The fresh entering coal rapidly mixes with the partially carbonized coal (char) circulating in the bed, so that as the fresh coal particles undergo plastic transformation and become sticky, the fresh coal particles primarily see particles which have already undergone plastic transformation and are now nonsticky. Carbonization products, gases, tars and other liquids, water and char are continuously withdrawn from the carbonization reactor.

EXAMPLE V

In an agglomerating ash gasifier of the type described in U.S. Pat. No. 3,171,369, 1000 pounds per hour of fresh Pittsburgh No. 8 seam coal, −60 mesh, is gasified at a temperature between about 816° C. and about 1000° C. with steam. Heat is provided by circulation to the gasifier of about 12,000 pounds per hour of agglomerated ash particles from a char fired, fluid-bed combustor. When the fresh coal is injected into the fluid-bed of ash and partially reacted coal, at a velocity of 20 feet per second with steam, partial agglomeration occurs. Large aggregates of char are formed which cannot be separated from the ash agglomerates and poor fluidization and soon poor thermal efficiency results. It is essential to the operation of the process that the coal, as it carbonizes and gasifies, remains free-flowing and finely-divided.

When the velocity of the injected Pittsburgh No. 8 coal and steam is increased to 400 feet per second, dispersion within the fluid-bed is excellent. No significant agglomeration occurs and separation of the fine char formed and the larger denser particles of agglomerated ash is readily accomplished. The introduction of the fresh coal into the fluidized, generally descending bed of hot agglomerated ash, at a velocity of 400 feet per second, occurs at a point near the bottom of the bed, but somewhat above the bottom to avoid carry-down of coal or char by the cycling ash. Injection is in a generally vertical and upward direction. This promotes great turbulence of ash, coal and char near the points of introduction, which disperses the coal throughout the bed and effectively prevents agglomeration.

What is claimed is:

1. A method of substantially preventing agglomeration of solid carbonaceous particles in a fluid-bed reaction zone maintained at a reaction temperature above about 500° C. and containing a matrix of non-agglomerating particles at said reaction temperature, said method comprising:
   a. introducing said solid carbonaceous particles in a dense phase in a carrier gas into the lower portion of said zone in an essentially vertically upwards direction at a predetermined velocity in excess of about 200 feet per second, said solid carbonaceous particles having been pre-heated to a predetermined temperature below their plastic transformation temperature, and being injected directly into said zone and into direct contact with the non-agglomerating particles therein through inlet means substantially at the bottom of said zone;
   b. introducing a reagent into said zone for reaction with said solid carbonaceous particles at said reaction temperature within said zone; and
   c. introducing liquid hydrocarbons as a separate injection stream into the lower portion of said zone in an essentially vertically upwards direction simultaneously with said introduction of solid carbonaceous particles and at a predetermined fluid velocity sufficient to rapidly and uniformly disperse said hydrocarbons within the matrix, said reagent introduced into the reaction zone reacting with said hydrocarbons as well as with said solid carbonaceous solids, whereby said solid carbonaceous particles and said liquid hydrocarbons are rapidly and uniformly dispersed within said matrix so that agglomeration of said particles is substantially prevented.

* * * * *